US008469418B2

(12) United States Patent
Dougherty

(10) Patent No.: US 8,469,418 B2
(45) Date of Patent: Jun. 25, 2013

(54) COMPACT SANITARY SPECIMEN COLLECTION DEVICE

(76) Inventor: Larry F. Dougherty, East Brunswick, NJ (US)

( * ) Notice: Subject to any disclaimer, the term of this patent is extended or adjusted under 35 U.S.C. 154(b) by 468 days.

(21) Appl. No.: 12/776,402

(22) Filed: May 9, 2010

(65) Prior Publication Data

US 2011/0184359 A1    Jul. 28, 2011

Related U.S. Application Data

(60) Provisional application No. 61/298,994, filed on Jan. 28, 2010.

(51) Int. Cl.
*A01K 29/00* (2006.01)
(52) U.S. Cl.
USPC .......................................... 294/1.5; 119/161
(58) Field of Classification Search
USPC .......... 294/1.3–1.5, 19.2, 210, 53.5; 119/161; 600/573, 574
See application file for complete search history.

(56) References Cited

U.S. PATENT DOCUMENTS

| | | | |
|---|---|---|---|
| 4,659,125 A * | 4/1987 | Chuan | 294/19.2 |
| 5,423,584 A * | 6/1995 | Pasternak | 294/19.2 |
| 5,442,970 A | 8/1995 | Hutchins | |
| 5,492,220 A | 2/1996 | Estay | |
| 6,039,370 A * | 3/2000 | Dooley et al. | 294/1.5 |
| 6,315,341 B1 * | 11/2001 | Leon et al. | 294/53.5 |
| 6,478,351 B1 * | 11/2002 | Nelson | 294/1.4 |
| 6,602,231 B1 | 8/2003 | Mariea | |
| 7,128,352 B1 | 10/2006 | Phippen | |
| D616,618 S * | 5/2010 | Pearcey | D30/162 |
| 2008/0098959 A1 * | 5/2008 | Iarrusso | 119/161 |
| 2008/0116704 A1 | 5/2008 | Botello | |
| 2009/0096227 A1 * | 4/2009 | Pender et al. | 294/1.5 |

\* cited by examiner

*Primary Examiner* — Dean Kramer
(74) *Attorney, Agent, or Firm* — Daniel Boudwin

(57) ABSTRACT

Disclosed is a compact, foldable, sanitary urine specimen collection device. The device is intended to collect urine specimens from domestic animals, such as dogs. A telescopic pole with a handle is attached to a pivotal support member for supporting a specimen collection container.

4 Claims, 4 Drawing Sheets

COMPACT SANITARY SPECIMEN COLLECTION DEVICE

CROSS REFERENCE TO RELATED APPLICATION

This application claims the benefit of U.S. Provisional Application No. 61/298,994 filed on Jan. 28, 2010, entitled "Wee-Wee Wand"

BACKGROUND OF THE INVENTION

1. Field of the Invention

The present invention relates to an improved device for collecting urine specimens from domestic animals.

2. Description of the Prior Art

Many domestic animals, particularly dogs, require regular collection of urine specimens for a variety of medical reasons. Veterinarians presently lack adequate instruments to assist the owner in collecting these specimens. Typical instructions from a Veterinarian are to allow the specimen to pool on the ground and to then use a baster to suck up the urine and place it into a container. This method has clear contamination drawbacks. Other instructions include placing a frisbee or pot under the animal when it urinates, but animals are reluctant to urinate when their owner is holding a large pot under them. Yet the biggest drawback of this method is that the owner will frequently get urine on themselves due to their proximity to the urine stream.

The use of specimen collection devices is known in the art. More specifically, specimen collection devices heretofore devised and utilized are known to consist basically of familiar, expected and obvious structural configurations. While prior art devices may be practical for collecting a specimen, their is a need for improvement. Prior art devices fail to allow adequate adjustment of the angle when collecting a specimen, which is necessary for both different sized animals and different sized users. Prior art devices also fail to address the need to store the device when not in use, as a urine collection device is not something desired in plain view in a coat closet or the like. Known prior art urine collection devices displaying these drawbacks are discussed in detail below.

In Botello, U.S. patent application Ser. No. 11/985,472, an apparatus is disclosed to collect urine specimens from an animal. The apparatus consists of an elongated pole with a collection cup fixed to one end. The Botello application fails to provide a compact device that can be easily stored. Botello also does not provide a device that is adjustable in either length or angle. Botello also does not allow for a urine specimen cup to be used, but instead provides a reusable bowl. Presumably, this would require the user to transfer the specimen into an appropriate container and to then clean out the contaminated bowl. This process requires more time and a higher likelihood of spillage.

In Mariea, U.S. Pat. No. 6,602,231, a specimen collection device is disclosed that includes a telescopic pole and an attached collection cup. The attached cup faces the same drawbacks as in Botello. While the telescopic pole may provide a more compact device, it fails to allow adjustments in the angle of the collection device. Furthermore, Mariea fails to provide a locking means for the telescopic pole, which may cause it to extend or retract unpredictably.

In Estay, U.S. Pat. No. 5,492,220, an apparatus for supporting a cup when taking urine samples is disclosed. While estay provides a device that holds a separate removable collection container, it fails to offer any adjustments to the length or angle of the device. Furthermore, and due to the lack of adjustments in length, the user has to get in close proximity to the animal, which may scare them or cause the user to be sprayed.

SUMMARY OF THE INVENTION

In view of the foregoing disadvantages inherent in the known types of specimen collection devices now present in the prior art, the present invention provides a new specimen collection device construction wherein the same can be utilized for providing convenience for the user when collecting a specimen and when storing the device.

It is therefore an object of the present invention to provide a small, adjustable, easy to use specimen collection device for obtaining a urine specimen from an animal.

Another object of the present invention is to provide a specimen collection device that is compact for storage while being adjustable in both length and angle for use. The device may also be capable of hanging in a storage area.

Yet another object of the present invention is to provide a specimen collection device that is capable of receiving a variety of different size collection containers so as to not contaminate the device itself during use.

Other objects, features and advantages of the present invention will become apparent from the following detailed description taken in conjunction with the accompanying drawings.

BRIEF DESCRIPTIONS OF THE DRAWINGS

DETAILED DESCRIPTION OF THE INVENTION

Figure 1:
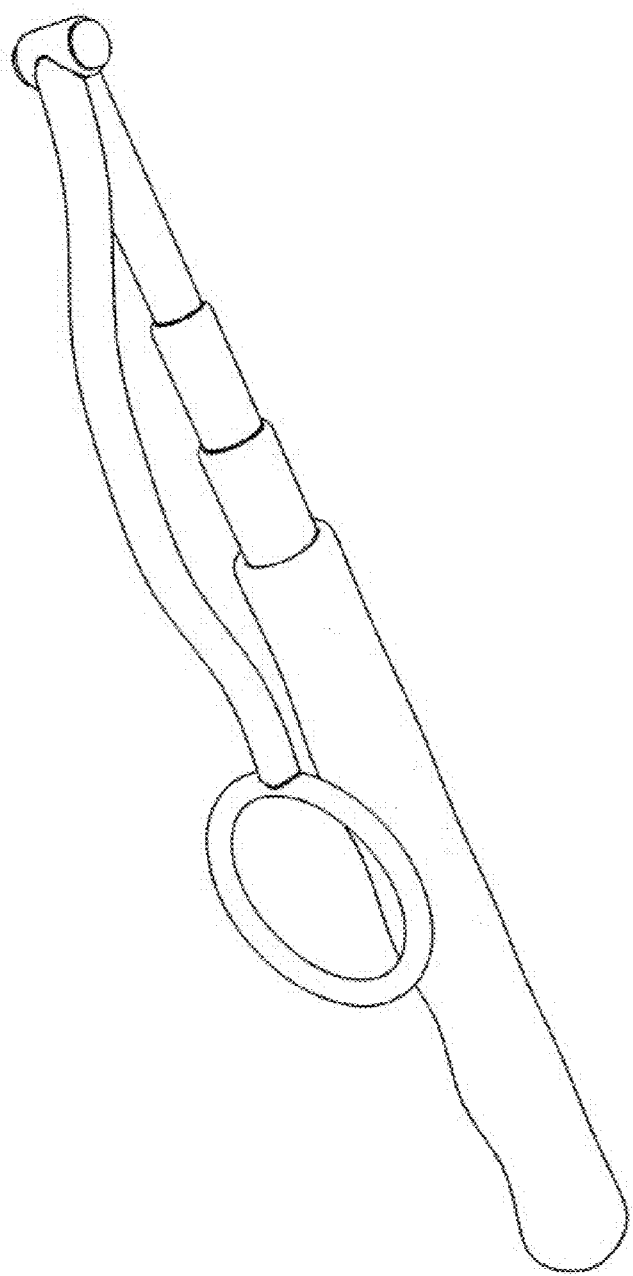
FIG. 1 is a perspective view of the basic structure for the present invention in the collapsed and folded position.

Referring now to FIG. 1, there is shown a perspective view of the device in its collapsed and folded position.

Figure 2:
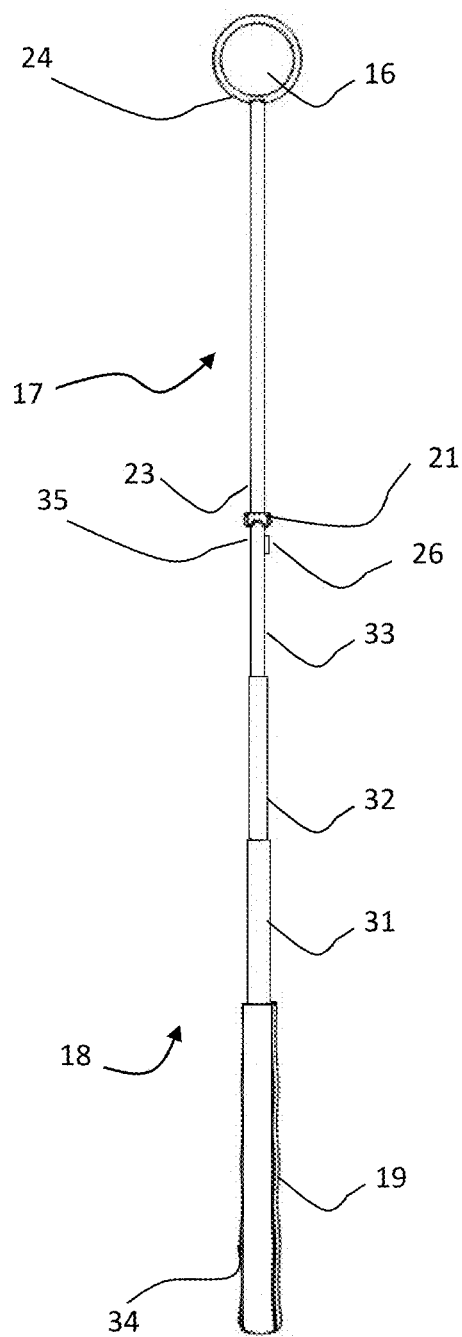
FIG. 2 is a top view of the present invention in the extended and unfolded position.

Referring now to FIG. 2, there is shown a top view of the specimen collection device in the fully extended and unfolded position. The device being capable of receiving a urine specimen container in an annular opening 16 at the annular supporting end 24 of the support member 17. The annular opening 16 is capable of supporting a variety of different size conical or tapered containers. The support member 17 being pivotably attached to a telescopic pole 18 at a pivot joint 21 located at the flat pivot end 23 of the support member and the pivot end 35 of the pole. The support member has a generally circular cross section.

The telescopic pole consists of a plurality of tubular members 18 telescopically attached to each other. The tubular members include a first tubular handle member 19 connected to a plurality of intermediate tubular members 31-32 being telescopically attached to the first tubular handle member 19, and further includes an end tubular member 33 which is telescopically attached to an intermediate tubular member 32 and pivotably attached to the support member 17 at the geared pivot joint 21.

The first tubular handle member 19 is coated with a soft grippable material on its exterior surface to form a handle.

The handle having a plurality of ridges 34 on its exterior surface to comfortably conform with a human hand.

Figure 3:
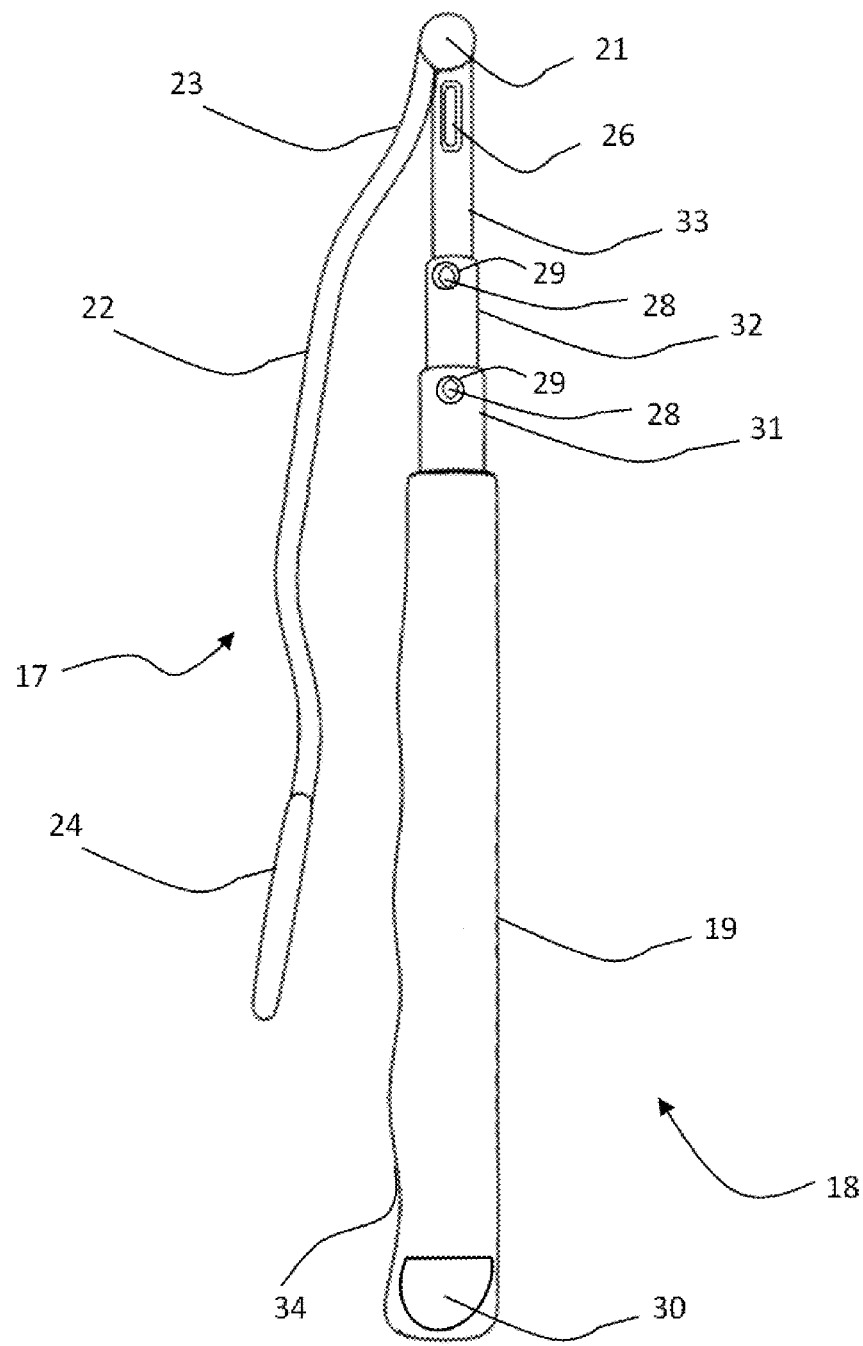
FIG. 3 is a side view of the present invention in the collapsed and folded position.

As shown in FIG. 3, the telescopic pole 18 is capable of retracting into the compact position shown. The support member 17 is capable of pivoting about the geared pivot joint 21 into a folded position as shown. In a preferred embodiment, the support member has a curved mid section 22 with respect to the flat pivot end 23 and flat annular support end 24 to ensure it does not come in contact with the animal's body when taking a specimen. When any of the tubular members are fully extended or retracted, pressure tabs 28 on each pole member will line up with holes 29 in the adjoining member, causing the pole to lock in the extended or retracted position. When the length of the pole is to be extended or retracted, the pressure tabs 28 are pushed in, allowing the adjoining tubular member to telescopically slide. At the free end of the handle is a through hole 30 for hanging the device during storage. A button 26 is present at the pivot end 35 of the tubular end member 33. The button 26 is capable of engaging and disengaging the pivot joint by being pressed into the tubular end member 33, as shown more clearly in FIG. 5.

Figures 4, 5:
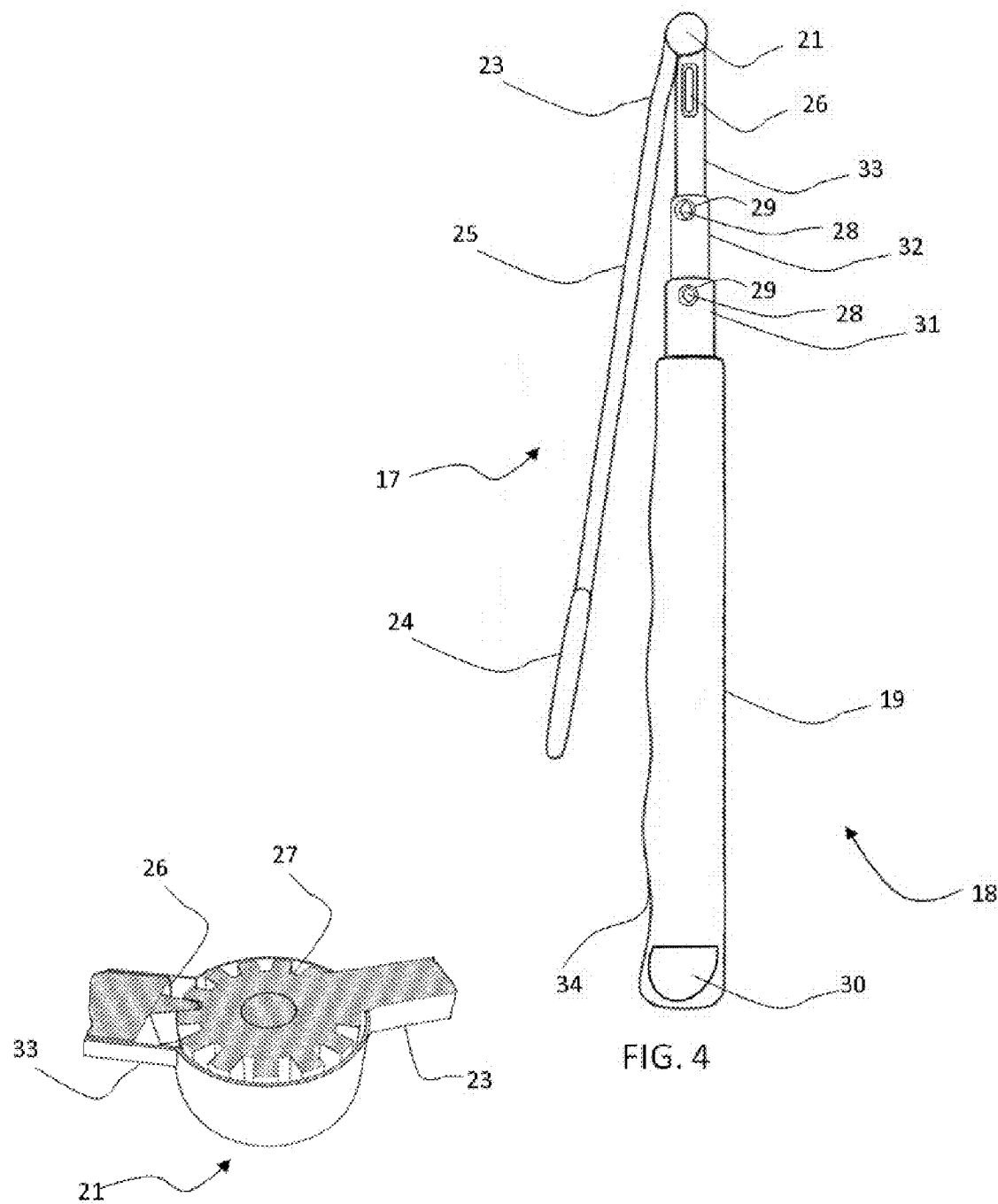
FIG. 4 is a side view of an alternate embodiment of the present invention in the collapsed and folded position.
FIG. 5 is an exploded sectional view of the pivot location that connects the telescopic pole to the support member.

FIG. 4 illustrates an alternate embodiment where the support member 17 has a straight midsection 25.

FIG. 5 illustrates the pivot joint 21 and button 26 interface. The button 26 is slidable into the tubular end member 33 to cause the button 26 to engage and disengage the internal gears 27 of the pivot joint 21, allowing the angle of the support member 17 to be fixed relative to the pole 18. Gears 27 internal to the pivot joint 21 are formed integral to the flat pivot end 23 of the support member 17.

In use a urine specimen collection cup can be inserted into the annular support. The telescopic pole can be adjusted to the desired length and the support member can be adjusted to the desired angle. The annular end supporting the collection cup can be held in position under the animal while the animal urinates.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An apparatus for use with a urine collection cup adapted to collect an uncontaminated urine specimen from an animal, comprising:

a telescopically adjustable pole with a tubular handle member, a plurality of intermediate tubular members telescopically attached to said tubular handle member, and an end tubular member telescopically attached to said intermediate tubular members;

said end tubular member being pivotably attached to an elongated support member, wherein said support member has a first pivot end pivotably attached to said end tubular member at a geared pivot joint capable of being engaged and disengaged via a button disposed on said tubular handle, a mid section, and an annular support end section, wherein said annular support end section supports a removable urine specimen collection container;

said support member midsection has two straight end sections and an intermediate section that is shifted in position, forming an elongated u-shaped disposed between said straight end sections;

internal gears disposed within said pivot joint and operatively connected to said button to affect engagement and disengagement of said pivot joint via said button;

and wherein the rotational position of said support member relative to said telescopically adjustable pole is adjusted by engagement or disengagement of said pivot joint via said button.

2. The apparatus of claim 1, wherein said tubular handle member has an interior and an exterior surface; said exterior surface has a soft grippable coating, wherein said soft grippable coating forms a plurality of ridges to conform to a human hand.

3. The apparatus of claim 1, wherein each of said intermediate tubular members have a pressure tab for locking said intermediate tubular members in a telescopically extended position.

4. The apparatus of claim 1, wherein said tubular handle member has a free end with a through hole for hanging said tubular handle member.

* * * * *